Figure 1:
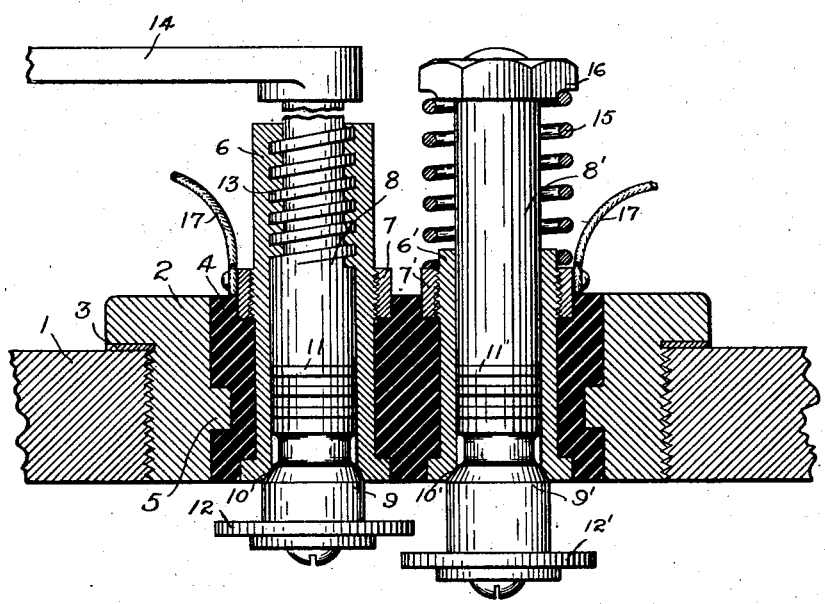

No. 729,499. PATENTED MAY 26, 1903.
J. MacHAFFIE.
IGNITER FOR GAS ENGINES.
APPLICATION FILED OCT. 3, 1902.

NO MODEL. 2 SHEETS—SHEET 1.

WITNESSES:
Robt. C. Chapman
Helen Oxford

INVENTOR:
John MacHaffie,
by Albt. H. Dann
Atty.

No. 729,499. PATENTED MAY 26, 1903.
J. MacHAFFIE.
IGNITER FOR GAS ENGINES.
APPLICATION FILED OCT. 3, 1902.
NO MODEL. 2 SHEETS—SHEET 2.
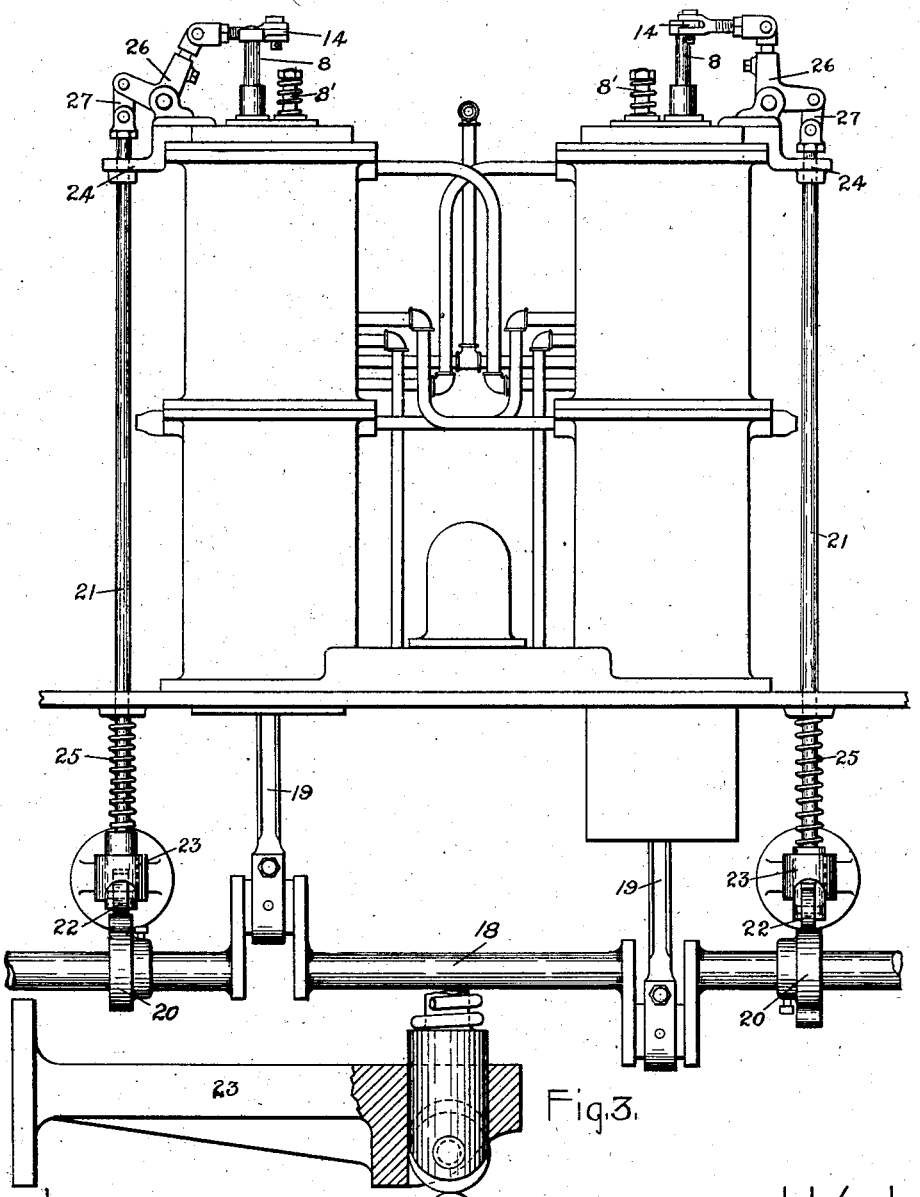
WITNESSES: INVENTOR:
John MacHaffie,
by
Atty.

No. 729,499. Patented May 26, 1903.

UNITED STATES PATENT OFFICE.

JOHN MacHAFFIE, OF SCHENECTADY, NEW YORK.

IGNITER FOR GAS-ENGINES.

SPECIFICATION forming part of Letters Patent No. 729,499, dated May 26, 1903.

Original application filed August 12, 1901, Serial No. 71,676. Divided and this application filed October 3, 1902. Serial No. 125,813. (No model.)

*To all whom it may concern:*

Be it known that I, JOHN MACHAFFIE, a subject of the King of Great Britain, residing at Schenectady, county of Schenectady, State of New York, have invented certain new and useful Improvements in Igniters for Gas-Engines, of which the following is a specification.

The present invention is a division of my allowed application, Serial No. 71,676, filed August 12, 1901, on gas-engines, which division is made under the requirements of the rules of the United States Patent Office.

This invention relates to motors driven by an explosive mixture of air and hydrocarbon vapor; and its object is to provide an improved firing-pin or igniter of the electric-spark type. More or less difficulty has been found in igniters of this kind in keeping the contacts clean, so that there will be no danger of a failure of the spark.

My invention comprises an igniter in which means are provided for effecting a rubbing and twisting action between the contacts in order to keep them clean and present new surfaces of contact at each actuation.

In the accompanying drawings, which illustrate my invention, Figure 1 is a longitudinal section of an igniter. Fig. 2 is a side elevation of a gas-engine fitted with an igniter, and Fig. 3 is a detail view of the cam employed to actuate the igniter.

In the cylinder-head 1 is inserted a removable bushing 2, which is preferably screwed into a tapped opening in the head and provided with a suitable gasket or packing 3 to produce a gas-tight joint. In the bushing is a block of insulation 4, which is preferably retained in place by projections 5 on the inside of the bushing. Through the insulation pass two sleeves 6 6', which are secured therein in any suitable manner, as by means of nuts 7 7'. In each sleeve is a stem 8 8', having at its lower end a valve-faced collar 9 9', fitting a seat 10 10' in the lower end of the sleeve to make a gas-tight joint. Above the collars are packing-rings 11 11'. The inner end of each stem carries a contact-disk 12 12', one overlapping the other and normally separated from it, as shown. One of said stems, as 8, is provided with means for imparting to it a combined oscillating and longitudinal movement—such, for instance, as a screw-thread 13, of coarse pitch, meshing with similar threads in the upper part of the sleeve 6. By means of an arm 14 or other suitable device the stem can be connected with a moving part of the engine, so as to receive impulses at regular intervals. The inward-twisting motion of the stem causes its disk 12 to strike the lower disk 12' and partially rotate it with a rubbing action. A spring 15 between the sleeve 6' and a head 16 on the stem 8', carrying the lower disk, permits said stem to yield inwardly when the disks come in contact.

Each sleeve is connected with a terminal 17 of an electric circuit, which may include an induction-coil or the like to increase the length of the spark.

The valve-stem 8 is actuated by a screw-thread of steep pitch, and in case there is any backlash between the threads on the stem and those in the sleeve 6 the force of the explosion will cause the valve-faced collar 9 to be pressed against its seat 10, assuming, of course, that the lever 14 has moved the stem to the proper position. The lever may rock or oscillate over any angle necessary; but it is desirable to make it small and have the pitch of the screw such that it will move the disk 12 downward to the necessary point. By providing the spring 15 any motion of the disk 12 beyond that necessary to engage the disk 12' is taken care of. The space between disks has been somewhat exaggerated for purposes of illustration. The explosion takes place at the instant the disks separate, and the force thereof acting on the head of the stem 8 will force the valve-face on the collar 9 against its seat, the backlash between the screw-threads permitting it. The explosion will also act on the stem 8', and the valve-face on the collar 9' will firmly engage with its seat 10'. Each time the disk 12 is moved into engagement with the disk 12' it has a tendency to rotate it, and the result is that good clean contact-surfaces are presented at all times. The disks 12 and 12' may or may not be made to rotate independently of the stems 8 and 8', as desired. The friction between the disks and their supports tends, of course, to resist any such rotation and at the same time insure a rubbing of the parts.

From the foregoing it will be seen that when the charge is exploded the pressure forces the valve-faces tightly against their seats, thus preventing any escape of gas around the stems.

In Fig. 2 is shown a two-cycle gas-engine having a crank-shaft 18, that is coupled to the pistons by connecting-rods 19. On the main shaft is a cam 20, that raises a rod 21 once for one revolution. On the lower end of the rod is an antifriction-roller 22, that bears on the cam. The lower end of the rod is guided by the support 23, and the upper end is guided by a projection 24, carried by the upper end of the cylinder. Between the head on the lower end of the rod 21 and a fixed abutment is a compression-spring 25, that returns the rod to its lowest position after being elevated by the cam. Motion is transmitted from the rod to the contact actuating-arm 14 by a bell-crank lever 26, that is adjustably connected at one end to the arm and loosely connected to the rod by a link 27. Obviously as the main shaft rotates a vertical movement is imparted to the rod, which causes a rocking motion of the bell-crank lever, and this in turn oscillates the arm 14. As the arm oscillates the stem 8 moves up and down in a manner to make and break the circuit between the disks 12 and 12'. (Shown in Fig. 1.) A duplicate cam, rod, and bell-crank lever, &c., are provided for the second cylinder and operated in the same manner. The cams are set oppositely, so as to have the sparking take place at the proper time.

In accordance with the provisions of the patent statutes I have described the principle of operation of my invention, together with the apparatus which I now consider to represent the best embodiment thereof; but I desire to have it understood that the apparatus shown is merely illustrative and that the invention can be carried out by other means.

What I claim as new, and desire to secure by Letters Patent of the United States, is—

1. In a gas-engine, an electric igniter consisting of two terminals which rotate with respect to each other, each carrying a disk.

2. In a gas-engine, an electric igniter consisting of two terminals each carrying a rotatable disk, and means for oscillating and reciprocating one of said terminals.

3. In a gas-engine, an electric igniter consisting of two rotatable terminals one of which is yielding axially, and means for simultaneously oscillating and reciprocating the other terminal.

4. In a gas-engine, an electric igniter having two contacts rotatable with respect to each other, and means for imparting an oscillating and reciprocating movement thereto.

5. In a gas-engine, an electric igniter comprising two rotatable disks, and means for causing said disks to partially rotate when they make contact in order to present a new surface for the next contact.

6. In a gas-engine, an electric igniter comprising two parallel and axially-movable stems which rotate with respect to each other, overlapping disks on said stems, a spring holding one of said stems in a normal position, and a screw of rapid pitch on the other stem, whereby the latter will be moved axially when oscillated.

In witness whereof I have hereunto set my hand this 2d day of October, 1902.

JOHN MacHAFFIE.

Witnesses:
BENJAMIN B. HULL,
HELEN ORFORD.